United States Patent [19]

Kern et al.

[11] 4,256,440
[45] Mar. 17, 1981

[54] LIQUID DOSING APPARATUS

[75] Inventors: Johann Kern, Vachendorf; Walter Eichner, Siegsdorf, both of Fed. Rep. of Germany

[73] Assignee: Lang Apparatebau GmbH, Siegsdorf Obb., Fed. Rep. of Germany

[21] Appl. No.: 55,953

[22] Filed: Jul. 9, 1979

[30] Foreign Application Priority Data

Jul. 19, 1978 [DE] Fed. Rep. of Germany ....... 2831625

[51] Int. Cl.³ .................. F04B 23/06; F04B 19/00
[52] U.S. Cl. ................................ 417/391; 417/488; 417/503; 417/554
[58] Field of Search ............... 417/488, 489, 375, 377, 417/391, 405, 554, 503

[56] References Cited

U.S. PATENT DOCUMENTS

| 3,728,047 | 4/1973 | Mangialardi | 417/488 |
| 3,945,772 | 3/1976 | Moortele | 417/489 |
| 4,053,902 | 10/1977 | Skafvenstedt | 417/489 |

Primary Examiner—Robert W. Jenkins
Attorney, Agent, or Firm—Hammond & Littell, Weissenberger and Muserlian

[57] ABSTRACT

This invention is directed to an apparatus for dosing a solution into a liquid conduit by means of a piston dosing pump mechanically driven by the liquid pressure, which comprises a dosing pump having a chamber containing liquid from the conduit and into which the solution is delivered from a supply source, a spring-biased nonreturn valve between the dosing pump chamber and the liquid conduit, and a second pump which supplies fresh liquid to the dosing pump chamber, the piston of the second pump being synchronized with the piston of the dosing pump.

6 Claims, 2 Drawing Figures

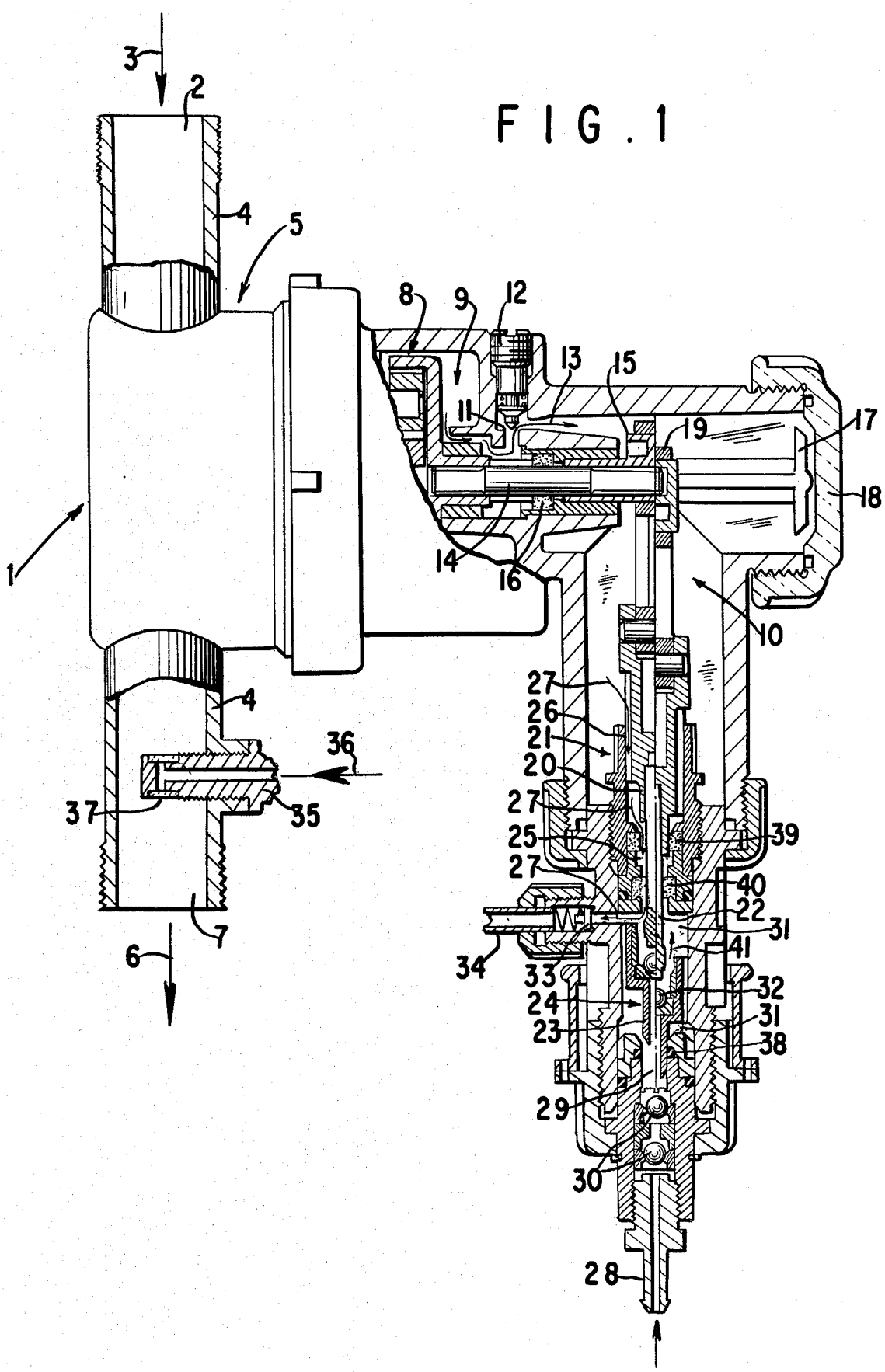

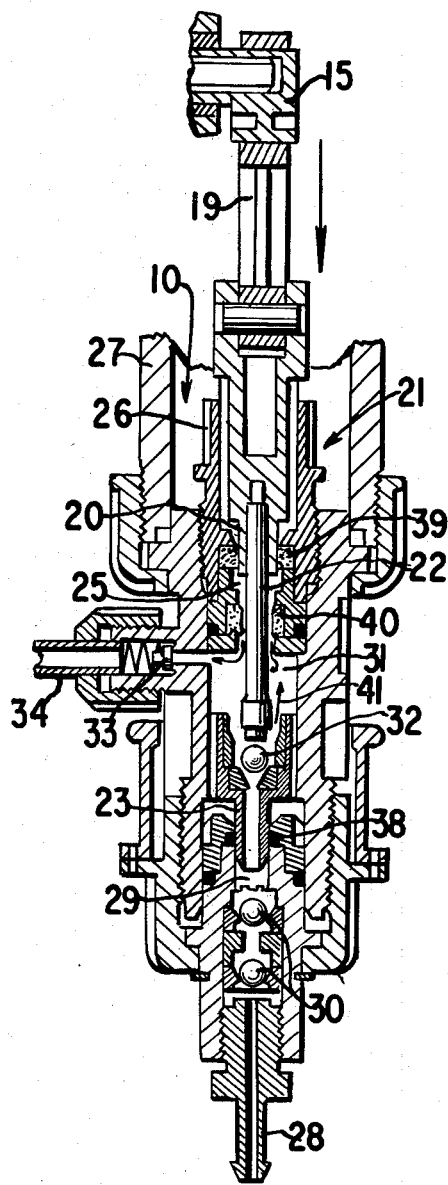
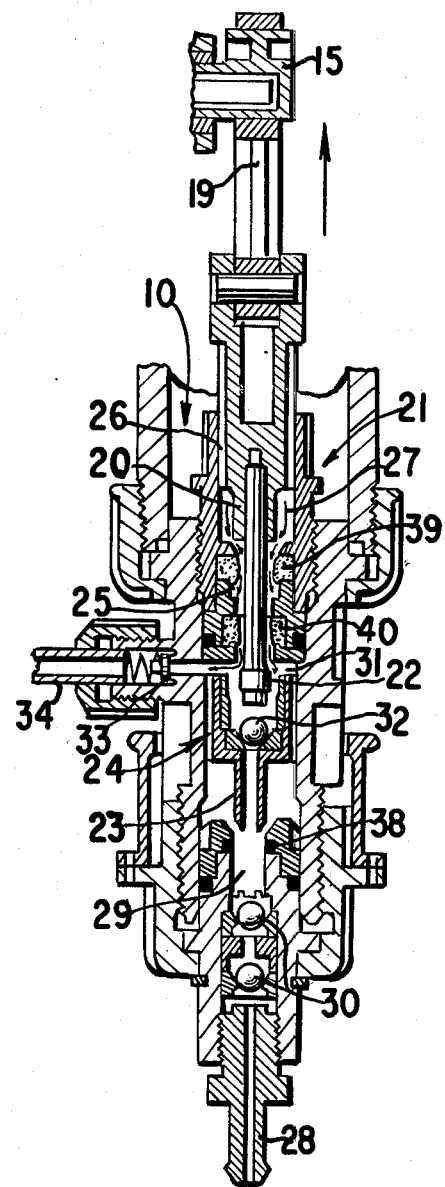

LIQUID DOSING APPARATUS

FIELD OF THE INVENTION

This invention relates to a dosing apparatus. More particularly, this invention relates an apparatus for dosing a solution into a liquid conduit by means of a dosing pump mechanically driven by the pressure of the liquid in the liquid conduit.

BACKGROUND OF THE INVENTION

Pumps for dosing, or injecting, liquids into liquid streams are known. Such devices have been described in, for example, German Published Applications (DOS) Nos. 2,352,677 and 2,600,572, and, while these devices are self-priming, self-ventilating and selfcleaning, they require an additional float chamber associated with the piston dosing pump to protect the device from running dry. Another disadvantage of these known devices is that though water flows into the float chamber and into the pump chamber when the device is started, the pressure of the water in the pump chamber is not as high as that of the water in the liquid conduit and thus priming difficulties can appear in the piston dosing pump.

OBJECTS OF THE INVENTION

It is an object of this invention to provide an apparatus for dosing a solution into a liquid conduit.

It is also an object of this invention to provide an apparatus for dosing a solution into a liquid conduit by means of a dosing pump mechanically driven by the pressure of the liquid in the liquid conduit.

It is further an object of this invention to provide a dosing pump having satisfactory suction behavior.

These and other objects of the invention will become more apparent in the discussion below.

BRIEF DESCRIPTION OF THE DRAWINGS

FIG. 1 represents a lateral, partial cross-section of an apparatus of the invention as installed in a liquid conduit wherein the piston mechanism is shown in split form, at the top of its stroke on the left and at the bottom of its stroke on the right.

FIG. 2 represents a sectional view of the piston mechanism at the bottom of its stroke whereas FIG. 3 represents a sectional view of the piston mechanism at the top of its stroke.

DETAILED DESCRIPTION OF THE INVENTION

Applicants have surprisingly discovered an improved apparatus for dosing solution into a liquid conduit which demonstrates satisfactory suction behavior, even at the beginning of operation. The improved apparatus has been designed so that it can dose liquid, or solution, into the liquid conduit against the pressure in the liquid conduit. More particularly, the invention comprises an apparatus for dosing a solution into a liquid conduit by means of a piston dosing pump mechanically driven by the liquid pressure, which comprises a dosing pump having a chamber containing liquid from the conduit and into which the solution is delivered from a supply source, a spring-biased nonreturn valve between the dosing pump chamber and the liquid conduit, and a second pump which supplies fresh liquid to the dosing pump chamber, the piston of the second pump being synchronized with the piston of the dosing pump. The new apparatus is self-ventilating, self-priming, self-cleaning, and dry runproof.

According to the invention, a second pump is provided whose piston is coupled, preferably rigidly, with the piston of the piston dosing pump proper, so that both pistons perform the same stroke movement. The second pump delivers simultaneously with each dosing stroke, liquid into the dosing pump chamber of the dosing pump proper. Due to the spring-biased nonreturn valve, any air sucked in by means of the dosing pump can be compressed, when it issues from the piston chamber of the dosing piston, to a pressure which exceeds that admitted from the liquid conduit. This has in turn the effect that the compressed air can be dosed and that the dosing pump can suck in the chemical against the system pressure, that is, the pressure admitted from the liquid conduit.

In the present devices of the above-described type, the air contained or sucked into the dosing pump chamber is not compressed to the system pressure or to a higher pressure. For this reason the known dosing pumps, due to their small stroke volume, could not displace the air contained in their pump chamber, with the result that the air frequently only pulsated and the dosing pump did not work. These difficulties can effectively be eliminated by applicants' invention.

In an advantageous embodiment of the invention, the second pump associated with the dosing pump is designed without valves. According to another feature of the invention, the necessary valve effect can be achieved by at least two spaced, elastic grooved rings placed about a drive-through rod rigidly connecting the pistons of the two pumps. These grooved rings then act as a valve between the pump chamber of the second pump and the dosing pump chamber. The two grooved rings should be so designed that they close the connection between the two pump chambers during the movement of the pistons out of the respective cylinders, and open on the sealing edge of the groove rings when the pistons move into the cylinders.

Preferably, liquid having the full pressure of the liquid conduit is admitted to the pump chamber of the second pump when its piston issues from the respective cylinder. The second pump then delivers substantially fresh liquid into the dosing pump chamber. The dosing accuracy is not impaired by this liquid dosed means of the second pump, because the amount of chemicals sucked-in is defined by the dosing pump proper. The amount of liquid introduced into the dosing pump chamber by means of the second pump according to the invention leads, however, to a pre-dilution of the chemical sucked-in at the same time. This has the advantage that at the injection point, that is, at the entrance point of the dosing agent into the liquid conduit, a better mixing with the fresh liquid contained there is ensured.

Just as in the known devices, a spring-biased nonreturn valve is arranged between the dosing pump chamber and the entrance point of the dosing agent into the liquid conduit, against the spring force of which the chemical, which may be diluted if necessary, is forced into the liquid conduit from the dosing pump chamber. In the known cases, the spring-biased nonreturn valve has only the function of preventing the return flow or of syphoning of the dosing liquid from the storage tank in case of a vacuum or underpressure in the liquid conduit. The nonreturn valve is therefore prestressed in the dosing pump chamber when setting a pressure exceeding the pressure in the dosing pump chamber. According to the invention the spring-biased nonreturn valve, which is preferably arranged at a higher level than the pump cylinder of the dosing pump, has among others the effect that in case of a lack of chemicals, the air which entered the dosing pump chamber, can be precompressed to a pressure exceeding the liquid pressure in the liquid conduit.

Other details of the invention can be seen in the embodiment set forth in the drawings. While the device according to the invention is suitable for dosing into liquids of any type, for simplicity's sake reference is made only to dosing into the water of a water conduit.

As shown in FIG. 1, water flows into the dosing pump apparatus 1 through feed 2 in the direction of arrow 3 via water conduit 4, partly or completely through a hydraulic motor 5 and issues in the direction of arrow 6 from outlet 7. A power transmission 8 with a gear chamber 9 is connected to hydraulic motor 5. The gear chamber 9 is connected to the water system, that is, water conduit 4, and to the following eccentric chamber 10 over a valve seat 11 and a valve screw 12. The corresponding path of the water is indicated by arrows 13. Transmission 8 actuates a drive shaft 14, which is connected to an eccentric 15 arranged in eccentric chamber 10. With valve seat 11 closed, eccentric chamber 10 is sealed from gear chamber 9 by means of grooved rings 16. With eccentric 15 or drive shaft 14 is coupled a function indicator 17, which can be seen through a clear screw union 18.

A connecting rod 19 is arranged on eccentric 15 of the above-described drive parts of the device. The connecting rod 19 is coupled with piston 20 of the second pump designated generally as 21. Piston 20 in turn is rigidly coupled by means of a drive-through rod 22 with dosing piston 23 of piston dosing pump 24. In the upper, center portion of second pump 21, the pump chamber is connected over inlet slots 26 with eccentric chamber 10. The corresponding path of water is indicated by arrows 27.

Other parts of the device are a suction pipe 28 leading to the storage tank (not shown) for the chemical solution to be dosed, suction valves 30 arranged between the suction pipe 28 and pump cylinder 29 of dosing pump 24, as well as pressure-valve 32 arranged between pump cylinder 29 and dosing pump chamber 31 of dosing pump 24. Dosing pump chamber 31 is connected over a spring-biased nonreturn valve 33 and a dosing pipe 34 to injection point 35 of water conduit 4. The dosing is effected in operation in the direction of arrows 36 through valve 37.

Dosing piston 32 of dosing pump 24 is sealed by means of an O-ring 38. Two grooved rings 39 and 40 are placed around drive-through rod 22, rigidly connecting pistons 20 and 23 of the two pumps. These rings form at the same time a suction-and pressure valve with piston 20 of second pump 21. The spring-biased nonreturn valve 33 is preferably arranged higher than pump cylinder 29 of dosing pump 24, i.e., between dosing pump 24 and pump 26. Drive-through rod 22 seals the connection of the two pump chambers 25 and 31 by means of grooved ring 40.

More particularly, the apparatus described works as follows:

At the start, water flows through feed 2 into hydraulic motor 5 and leaves the device through outlet 7. Hydraulic motor 5 drives eccentric 15 over transmission 8 and drive shaft 14. The two pistons 20 and 23 coupled with each other by drive-through rod 22 of the two pumps 21 and 24, perform a stroke movement, due to the coupling with connecting rod 19.

When piston 20 of the second pump 21 dips into the upper grooved ring 39 (see right half of FIG. 1), water sucked into pump chamber 25 of the second pump 21 is admitted with pressure through inlet slots 26. The sealing lips of the lower grooved ring 40 facing dosing pump chamber 31 open, and water flows past drive-through rod 22 into dosing pump chamber 31. Simultaneously with the above described movement, piston 23 of dosing pump 24 dips into its O-ring 38 and displaces the chemical solution or air (in case of a lack of chemicals) which have entered from the chemical storage tank (not shown) via suction pipe 28, in the direction of arrow 41 through a longitudinal bore of dosing piston 23 and over pressure valve 32, likewise into dosing pump chamber 31. Any air that has entered (in case of a lack of chemicals) is compressed to the pressure prevailing at the moment in dosing pump 31. The mixture of water/chemical of water/air is now driven into water conduit 4 at the end of the above-described piston movement in the direction of arrows 36 over spring-biased nonreturn valve 33, dosing pump 34, and injection point 35.

The effect of the upward movement of pistons 20 and 23 connected by drive-through rod 22, i.e., the suction process, can be seen in the left half of FIG. 1 and in FIG. 3. During the upward movement, an under-pressure or a vacuum is produced in pump cylinder 29 of dosing pump 24. The vacuum exists until piston 23 of dosing pump 24 is filled with chemical solution or air through suction pipe 28 and suction valve 30. During the same movement, an underpressure or vacuum is produced in pump chamber 25 of the second pump 21 by the action of the lower grooved ring 40 now bearing on drive-through rod 22. This vacuum rises as long as the force exerted by it on the upper grooved ring 39 exceeds the force with which the upper grooved ring 39 encloses piston 20 of the second pump 21. When the vacuum pressure is greater than the pressure of grooved ring 39, the sealing lips of grooved ring 39 open and water flows from the top, that is, from eccentric chamber 10, into pump chamber 25 of the second pump 21.

The spring-biased nonreturn valve 33 is provided so that the pressure in dosing pump chamber 31 can rise more than the pressure in water conduit 4 or in its outlet 7. The use of the spring-biased nonreturn valve 33 has the advantage that any air introduced into pump cylinder 29 of dosing pump 24 can be compressed in dosing pump chamber 31 to a pressure exceeding the water pressure in outlet 7. Thus, air can be added without any difficulty. This ensures a proper suction of the dosing pump, even in the most unfavorable cases, particularly when the device is started.

The spring-biased nonreturn valve 33 also has the effect that, in case of a vacuum in water conduit 4 or in its outlet 7, the chemical can not be sucked in as long as the spring of nonreturn valve 33 is so biased that it holds at least 1 bar pressure.

We claim:

1. An apparatus for dosing a solution into a liquid conduit by means of a piston dosing pump mechanically driven by the liquid pressure, which comprises a dosing pump having a chamber containing liquid from the conduit and into which the solution is delivered from a supply source, a spring-biased nonreturn valve between the dosing pump chamber and the liquid conduit, and a second pump which supplies fresh liquid to the dosing pump chamber, the piston of the second pump being synchronized with the piston of the dosing pump.

2. An apparatus of claim 1 wherein the spring-biased nonreturn valve is stressed to set a pressure of the dosing pump chamber exceeding the pressure in the liquid conduit.

3. An apparatus of claim 1 wherein the spring-biased nonreturn valve is arranged at a higher level than the pump cylinder of the dosing pump.

4. An apparatus of claim 1 wherein the pistons of the two pumps are rigidly coupled with each other by means of a drive-through rod.

5. An apparatus of claim 4 wherein at least two elastic grooved rings are placed about the drive-through rod and the grooved rings act as a valve between the pump chamber of the second pump and the dosing pump chamber.

6. An apparatus of claim 1 wherein the pump chamber of the second pump is charged with the full pressure of the liquid conduit when the piston of the second pump emerges from cylinder of the second pump.

* * * * *